United States Patent
Hall et al.

(10) Patent No.: US 7,971,416 B2
(45) Date of Patent: Jul. 5, 2011

(54) MOUNTING HYDRAULIC MOTOR ON MOWER DECK

(75) Inventors: Stanley Kermit Hall, Autryville, NC (US); Jeffrey David Witwer, Clayton, NC (US); James Edward Muse, Raleigh, NC (US); Roger Howard Tesch, Cary, NC (US); John Louis Bocksnick, Willow Spring, NC (US)

(73) Assignee: Deere & Company, Moline, IL (US)

( * ) Notice: Subject to any disclaimer, the term of this patent is extended or adjusted under 35 U.S.C. 154(b) by 1130 days.

(21) Appl. No.: 11/075,896

(22) Filed: Mar. 9, 2005

(65) Prior Publication Data

US 2006/0201124 A1 Sep. 14, 2006

(51) Int. Cl.
*A01D 69/00* (2006.01)

(52) U.S. Cl. .......................... 56/11.9; 248/638

(58) Field of Classification Search ................ 248/561, 248/562, 636, 638; 56/11.9, 6, 12.6, 320.1
See application file for complete search history.

(56) References Cited

U.S. PATENT DOCUMENTS

| | | | | |
|---|---|---|---|---|
| 3,545,706 A * | 12/1970 | Harshman | ...................... | 248/604 |
| 3,720,048 A * | 3/1973 | Grubb et al. | ................... | 56/15.9 |
| 3,783,702 A * | 1/1974 | Dehler | ................ | 74/89 |
| 3,841,425 A * | 10/1974 | Harkness | ..................... | 180/53.1 |
| 3,852,945 A * | 12/1974 | Berry et al. | ..................... | 56/12.7 |
| 3,901,003 A | 8/1975 | Erdman | .......................... | 56/12.6 |
| 4,183,195 A * | 1/1980 | James | .......................... | 56/11.9 |
| 4,452,033 A * | 6/1984 | Scramuzza | ..................... | 56/12.7 |
| 4,676,337 A * | 6/1987 | Martin | ........................... | 181/113 |
| 4,724,660 A | 2/1988 | Bowie et al. | ................... | 56/13.6 |
| 4,930,298 A | 6/1990 | Zenner | ........................... | 56/17.4 |
| 5,005,344 A * | 4/1991 | McCracken | .................... | 56/14.7 |
| 5,031,873 A * | 7/1991 | Rau | ................................ | 248/632 |
| 5,157,908 A * | 10/1992 | Sebben et al. | .............. | 56/320.1 |
| 5,481,857 A | 1/1996 | Umemoto et al. | ............. | 56/12.6 |
| 5,704,201 A * | 1/1998 | Van Vleet | ..................... | 56/14.9 |
| 5,894,715 A * | 4/1999 | Braun et al. | ................... | 56/11.9 |
| 5,980,220 A * | 11/1999 | Mazzucato et al. | ........... | 417/360 |
| 6,028,379 A * | 2/2000 | Bertolini et al. | ............... | 310/51 |
| 6,389,786 B1 | 5/2002 | Bergsten et al. | .............. | 56/17.5 |
| 6,450,474 B1 * | 9/2002 | Bucksbee | ...................... | 248/638 |
| 6,952,056 B2 * | 10/2005 | Brandenburg et al. | ....... | 290/1 A |
| 6,998,725 B2 * | 2/2006 | Brandenburg et al. | ....... | 290/1 A |
| 7,104,351 B2 * | 9/2006 | Robbins | ....................... | 180/181 |

FOREIGN PATENT DOCUMENTS

| | | |
|---|---|---|
| DE | 27 08 483 | 8/1978 |
| DE | 27 35 491 | 2/1979 |
| EP | 0 268 571 | 5/1988 |
| EP | 1 570 721 | 9/2005 |
| FR | 2329140 | 5/1977 |
| FR | 2 419 002 | 9/1979 |

OTHER PUBLICATIONS

John Deere 1600 Turbo Wide-Area Mower; Feb. 2003 Brochure.
Toro Groundmaster 580-D; 1990 Brochure.
Jacobsen Commercial Products and Professional Products; Jan. 1992 Brochure.

* cited by examiner

*Primary Examiner* — Thomas B Will
*Assistant Examiner* — Jamie L McGowan (57) ABSTRACT

A mounting assembly to mount the base of a hydraulic motor on a mower deck includes a cast iron mounting plate having stiffening structures around the perimeter and spanning the perimeter, and rubber isolators between the mounting plate and the mower deck.

12 Claims, 7 Drawing Sheets

MOUNTING HYDRAULIC MOTOR ON MOWER DECK

FIELD OF THE INVENTION

This invention relates generally to mounting a motor on the deck of a grass mowing machine, and specifically to a mounting structure for a hydraulic motor on a mower deck.

BACKGROUND OF THE INVENTION

Grass mowing machines with rotary cutting blades under a mower deck may have a hydraulic motor mounted on the deck. For example, grass mowing machines for large or commercial mowing applications such as parks, golf courses, highway medians and athletic fields may have one or more rotary cutting blades under each deck, and a hydraulic motor mounted on the top surface of each deck. These machines may include several mower decks extending from or linked to a frame propelled by an internal combustion engine or other power source.

A hydraulic motor mounted on a mower deck may be connected through hoses or conduits to a hydraulic pump that circulates pressurized fluid to the motors. The shaft of each hydraulic motor may be connected by pulleys and belts to vertically aligned spindles attached to blades under the deck, or directly to the blade spindle or shaft.

To mount a hydraulic motor on a mower deck, a lower surface or base of the motor may be bolted directly to the deck, or bolted to a plate which is then attached to the mower deck. Typically, mower decks that cover two or more rotary cutting blades use a plate that may be spaced one to three inches over the top surface of the mower deck. The spacing may provide necessary clearance for pulleys and belts that interconnect the motor drive shaft and blade spindles. Additionally, to provide clearance, one or more supports may be attached to the top surface of the mower deck, and may extend several inches above the deck's top surface. The plate may be bolted to the support structures.

Hydraulic motors vibrate during operation. When a hydraulic motor is mounted on a mower deck, the vibration of the motor may excite resonance of the mower deck, producing high noise and sound power levels.

There is a need for a low cost mounting assembly for a hydraulic motor on a mower deck that can reduce the excitation of resonance of the mower deck and high noise levels. There is a need for a mounting assembly that isolates, reduces or attenuates noise caused by vibration of a hydraulic motor on a mower deck of a grass mowing machine.

SUMMARY OF THE INVENTION

The present invention is a mounting assembly for a hydraulic motor on a mower deck of a grass mowing machine that reduces the excitation of resonance of the mower deck and results in lower noise levels during mowing. The mounting assembly may be used on a mower deck that covers one or more rotary cutting blades attached to the ends of vertically aligned spindles. The mounting assembly includes a mounting plate spaced from the surface of the mower deck, and a hydraulic motor mounted on the plate. The mounting plate is preferably cast iron and may include stiffening structures around the perimeter and spanning the perimeter. Rubber isolators are included between the mounting plate and the mower deck. A recess may be included in the mounting plate for positioning the hydraulic motor.

DESCRIPTION OF THE PREFERRED EMBODIMENT

Figure 1:
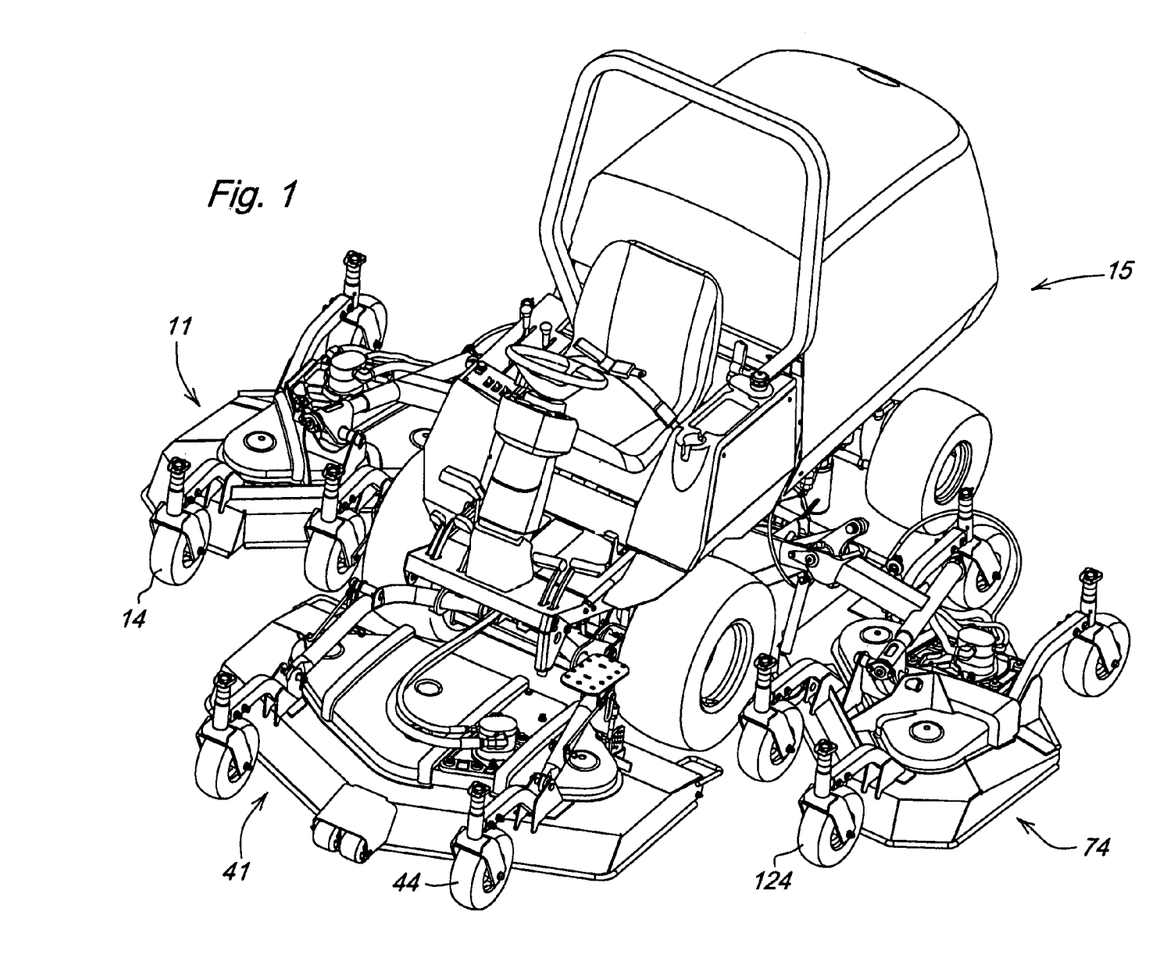
FIG. 1 is a top view of a grass mowing machine with three mower decks, each mower deck including a mounting assembly for a hydraulic motor.

FIG. 1 shows grass mowing machine 15 having mower decks 11, 41, 74 connected thereto. Several mower decks may be connected to the machine, and the mower decks may be configured to cut a swath having a width of 6 feet or more. Grass mowing machine 15 may have an internal combustion engine or other power source. Each mower deck may cover one or more rotary cutting blades attached to vertical spindles. The rotary cutting blades and spindles are rotated by hydraulic motors mounted on horizontal plates over the top surface of each mower deck. Mower decks 11, 41, 74 may be supported over the ground surface by wheels 14, 44, 124.

As shown in FIGS. 2-7 and described in more detail below, hydraulic motors that drive the rotary cutting blades under each mower deck are mounted to stiff mounting plates spaced from the mower deck. The mounting plates are preferably castings. Rubber isolators are positioned between the mounting plates and the mower deck to allow the motors to vibrate without exciting mower deck resonance and high noise levels. The mounting assembly of the present invention may result in much lower sound power levels of a mower deck, and overall reduction in sound power of grass mowing machine 15 of between about 2½dB(A) and about 4 dB(A).

Figure 2:
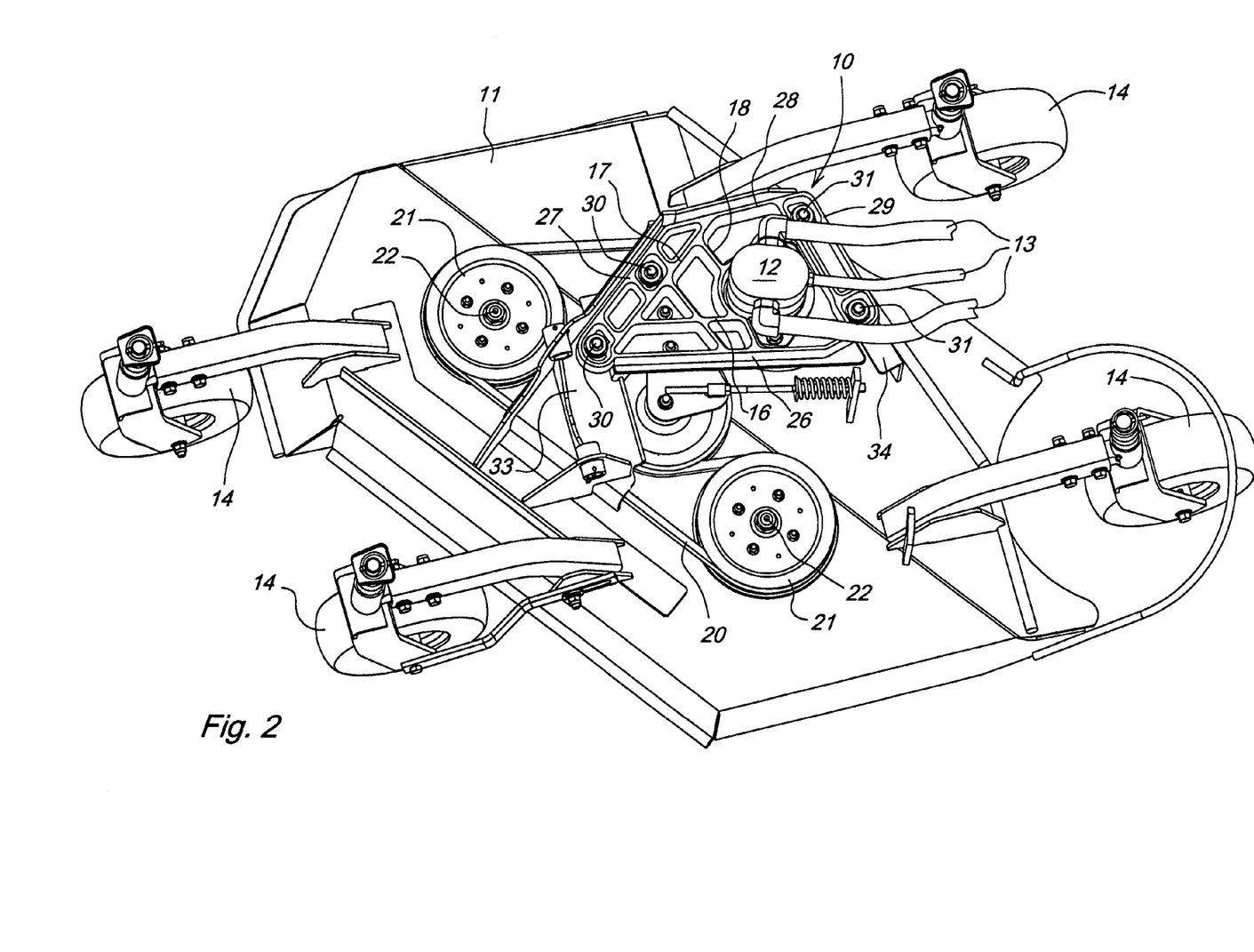
FIG. 2 is a top view of a mower deck with a mounting assembly for a hydraulic motor according to a first embodiment of the invention.
Figure 3:
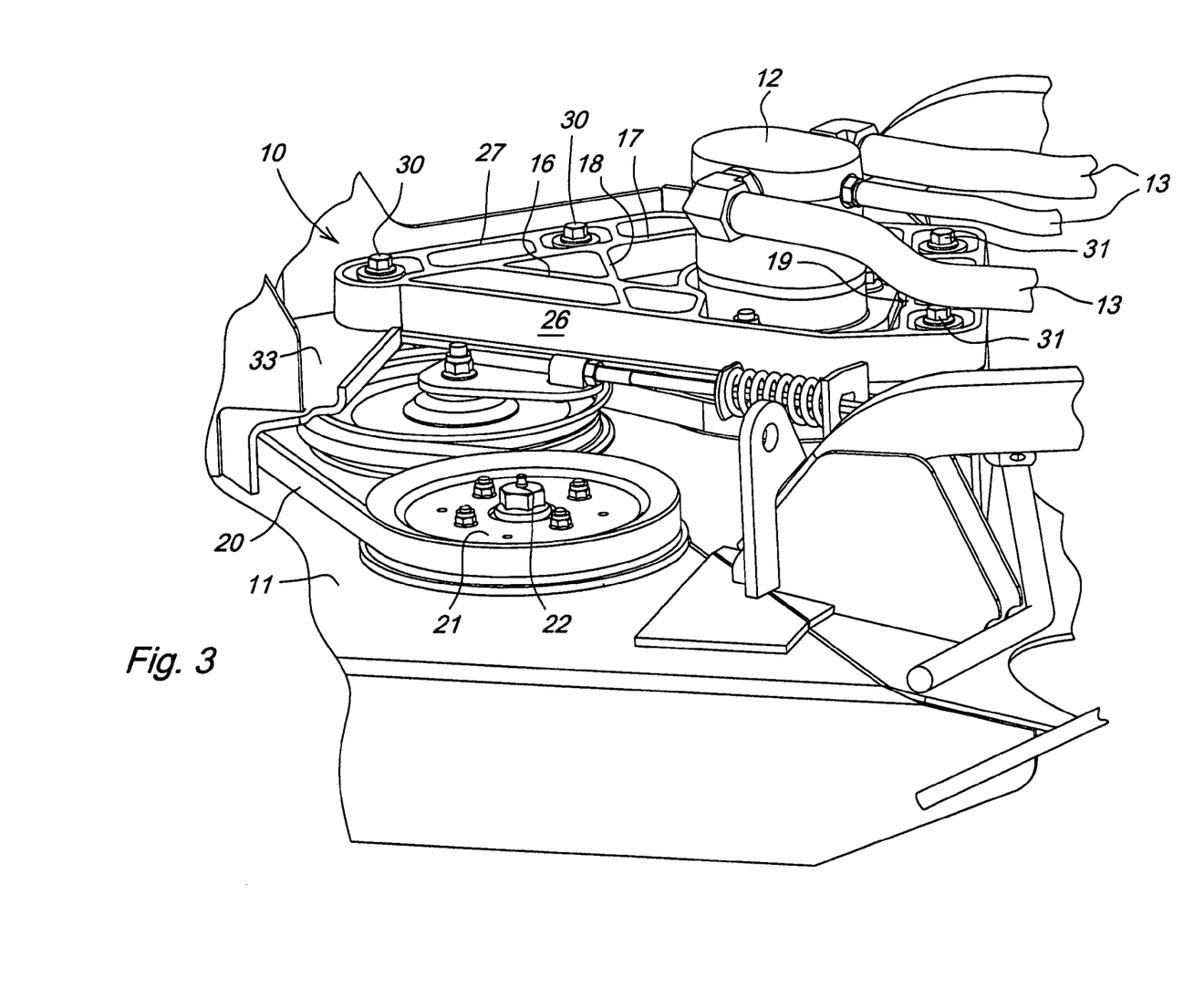
FIG. 3 is a side perspective view of a portion of a mower deck showing the hydraulic motor mounting assembly of the first embodiment.

In FIGS. 2 and 3, a first embodiment of the mounting assembly is shown. Mounting plate 10 is shown on mower deck 11 in a generally horizontal alignment. However, the present invention is not limited to a mounting plate having a horizontal alignment. The base of hydraulic motor 12 may be positioned on the mounting plate at a location spaced from the perimeter of the mounting plate. The hydraulic motor may be located near the center of the mounting plate or may be off-center. The hydraulic motor may be connected by hydraulic fluid lines 13 to a hydraulic pump (not shown). The hydraulic motor may have a downward extending output shaft, and a pulley may be mounted to the shaft to engage endless belt 20. The belt may be wound around pulleys 21 on vertical spindles 22. Under the deck, horizontal aligned rotary mower blades may be mounted to the lower ends of spindles 22.

Still referring to the embodiment of FIGS. 2 and 3, mounting plate 10 may have an outer perimeter with sides or edges 26-29. One or more of the sides or edges may include stiffening structures. For example, each of the sides or edges may include a rim or wall. Additional stiffening structures 16-19 may be included within the perimeter of the mounting plate. For example, stiffening structures 16-19 may be ribs, webs, or fins. In one embodiment, one or more of stiffening structures 16-19 may extend or span between two sides or edges of the mounting plate's outer perimeter. For example, rib 17 may extend between side 26 and side 28, and may be generally parallel to side 27. At least one of the stiffening structures may intersect or cross another stiffening structure, or the stiffening structures may form a spoked pattern. For example, rib 18 may intersect or cross rib 17.

In one embodiment, mounting plate 10 may be fastened to mower deck 11 with bolts 30, 31 inserted through openings near the perimeter of the mounting plate and corresponding openings in supports 33, 34. One or more supports 33, 34 may be welded or otherwise fixed to the surface of the mower deck. The supports may be positioned in alignment with at least two different sides or edges of the mounting plate's perimeter. In general, supports 33, 34 may project about one inch to about three inches over the mower deck's top surface. Additionally, and as will be described in more detail below, the mounting assembly of the present invention may include rubber isolators positioned between the mounting plate and the supports on the top surface of the mower deck.

Figure 4:
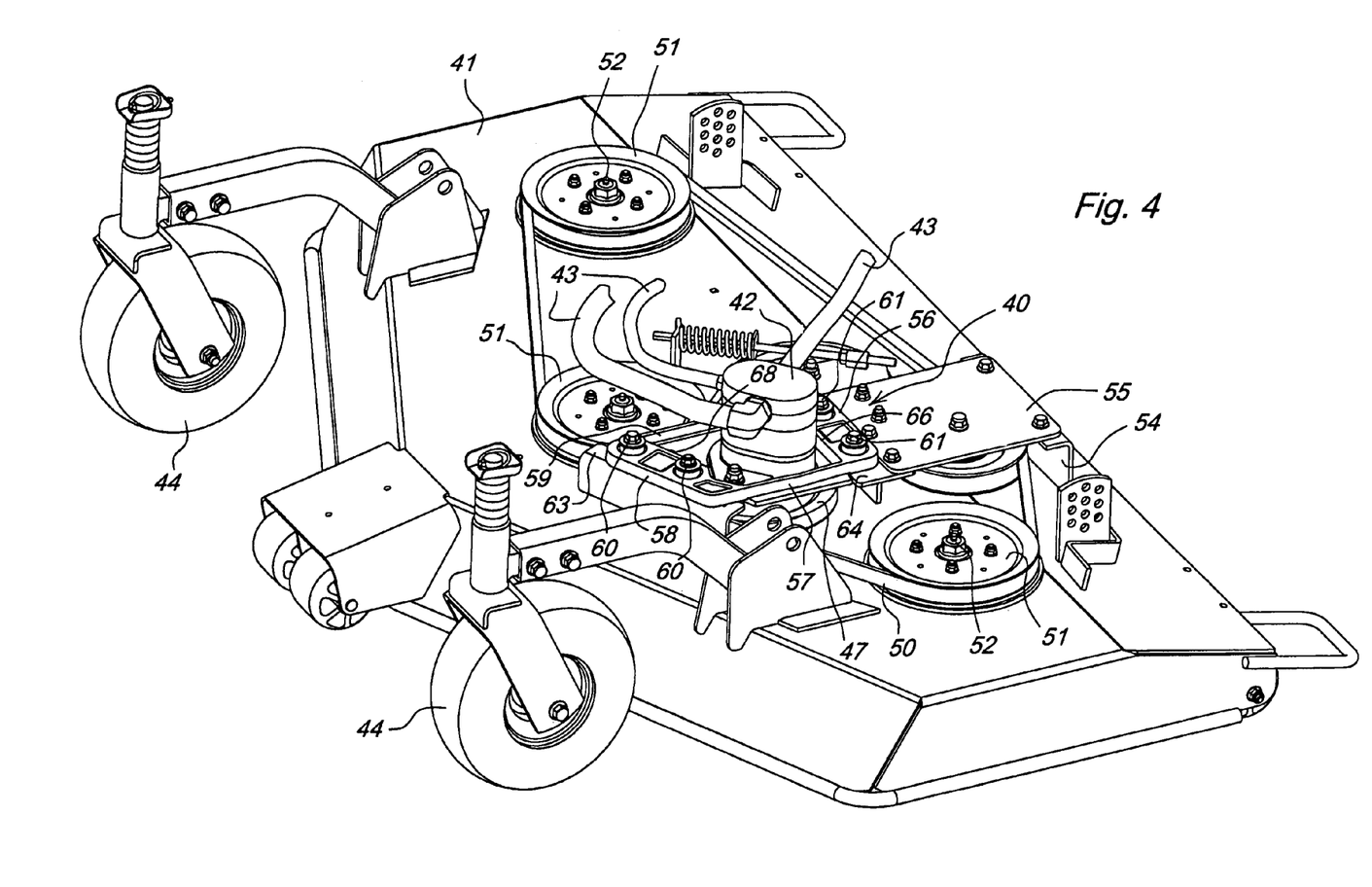
FIG. 4 is a perspective view of a mower deck having a mounting assembly for a hydraulic motor according to a second embodiment of the invention.
Figure 5:
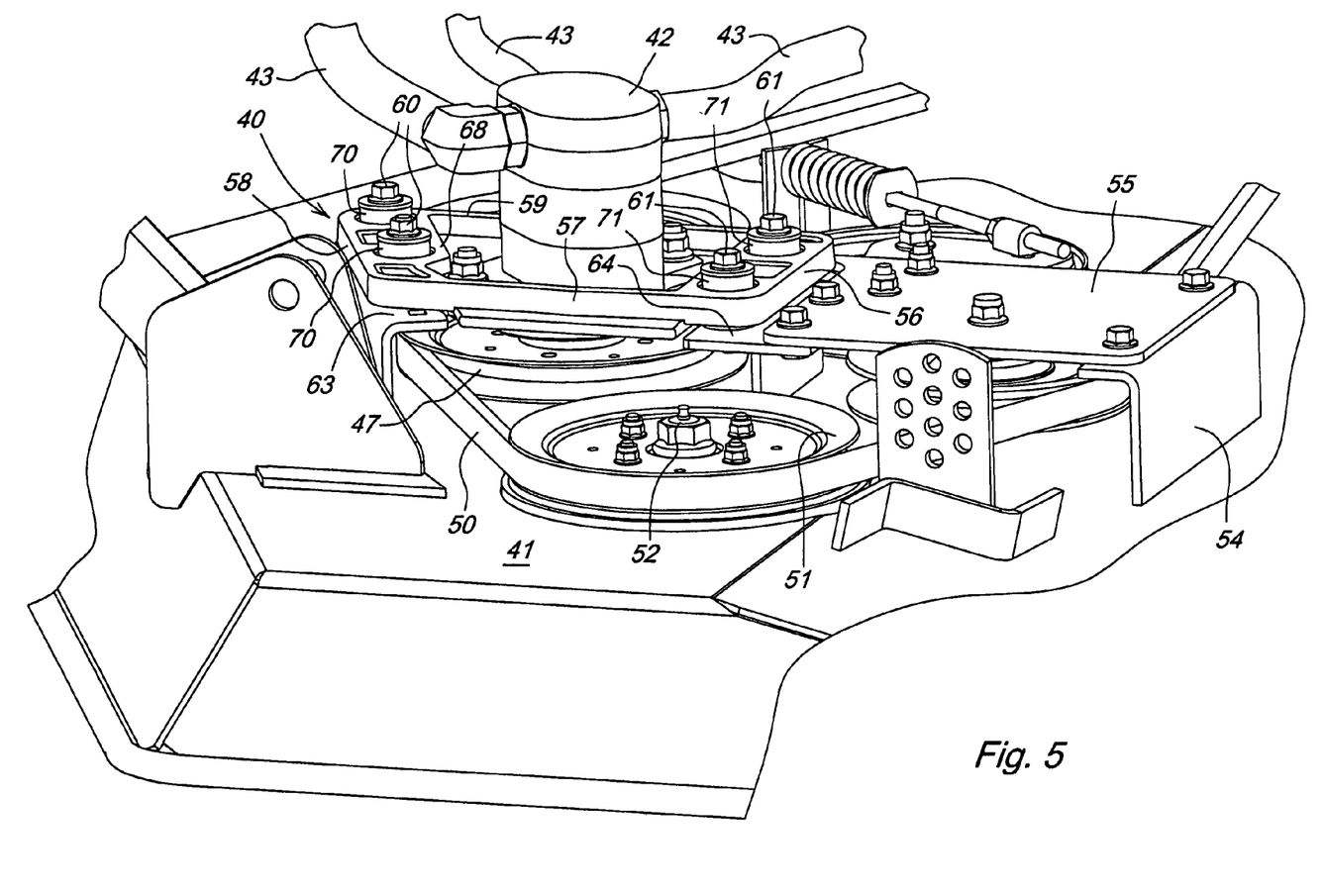
FIG. 5 is a side perspective view of a mower deck with a hydraulic motor mounting assembly according to the second embodiment.

Now referring to FIGS. 4 and 5, a second embodiment of the mounting assembly of the present invention is shown. Mounting plate 40 is mounted over the surface of mower deck 41. In FIGS. 4 and 5, mower deck 41 may house three rotary cutting blades. Hydraulic motor 42 may be attached to mounting plate 40, and may be connected with hoses or conduits 43 to a hydraulic pump (not shown). The hydraulic motor shaft may be connected to drive pulley 47 which engages belt 50 and rotates pulleys 51 mounted on spindles 52.

In the embodiment of FIGS. 4 and 5, mounting plate 40 may be attached with bolts 60, 61 to supports 63, 64 on the top surface of mower deck 41. Rubber isolators 70, 71 may be positioned between the mounting plate and supports 63, 64. Support 63 may be welded to the top surface of the mower deck. Support 64 may be bolted to extension plate 55, which may be bolted to support 54 welded to the top surface of the mower deck. The supports may locate and position the mounting plate in a plane sufficiently above the deck so that pulley 47 attached to the drive shaft of hydraulic motor 42 is aligned with pulleys 51 on vertical spindles 52. Endless belt 50 may be wound around pulleys 47, 51. A rotary cutting blade may be attached to the lower end of each spindle 52.

In the embodiment shown in FIGS. 4 and 5, mounting plate 40 may have an outer perimeter with sides or edges 56-59. One or more of the sides or edges may include stiffening structures. For example, the sides or edges may include an outer rim or wall that provides enhanced stiffness for the mounting plate. Additionally, stiffening structures 66, 68 may extend or span between sides or edges of the outer perimeter. Stiffening structures 66, 68 may be ribs, webs, fins or spokes.

Figure 6:
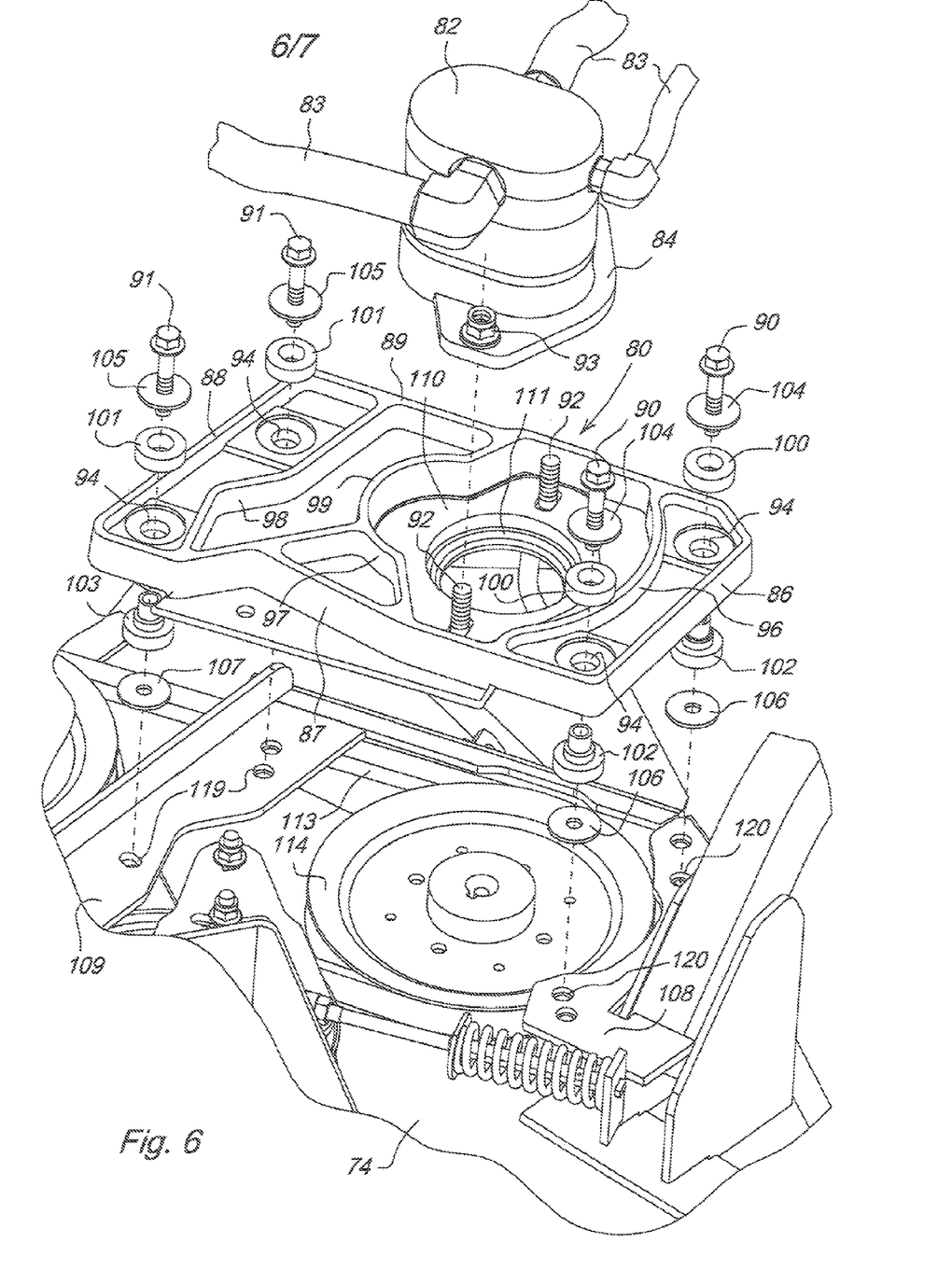
FIG. 6 is an exploded view of a portion of a mower deck, mounting assembly and hydraulic motor according to a third embodiment of the invention.
Figure 7:
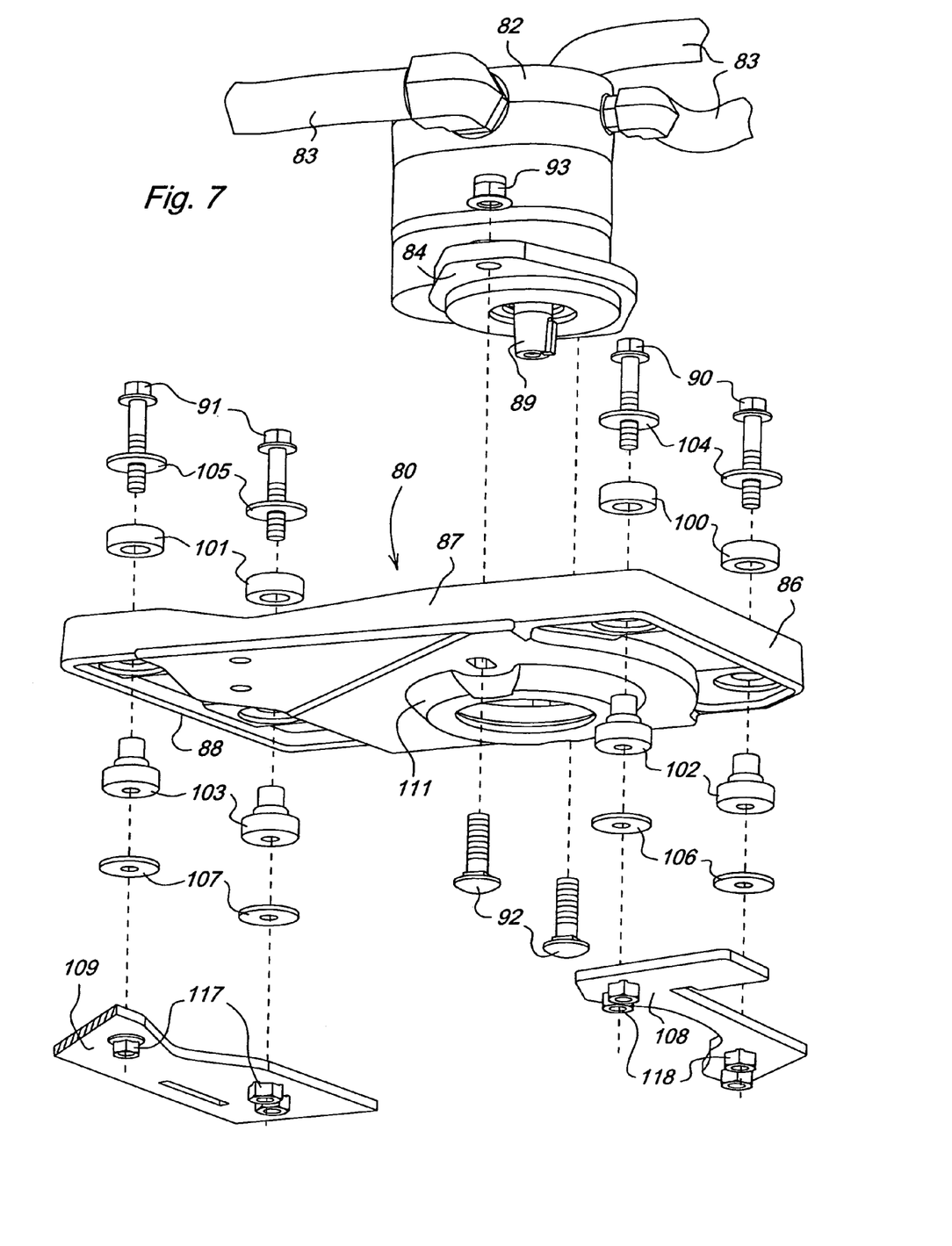
FIG. 7 is an exploded view of a mounting assembly and hydraulic motor of the third embodiment.

A third embodiment of the mounting assembly is shown in FIGS. 6 and 7. Hydraulic motor 82 may be attached to mounting plate 80 with threaded fasteners 92 such as carriage bolts inserted through flange 84 on the base or lower end of the hydraulic motor, and secured with nuts 93. The hydraulic motor may be connected to a hydraulic pump (not shown) through hoses 83. The hydraulic motor may have a generally vertically aligned drive shaft 89 keyed to drive pulley 114 to engage belt 113. The belt may be wound around pulleys on vertical spindles for each rotary cutting blade (not shown).

In the embodiment of FIGS. 6 and 7, mounting plate 80 may be fastened to supports 108, 109 on mower deck 74. Supports 108, 109 may be welded or otherwise secured to the mower deck, and may extend about one inch to about three inches above the top surface of the deck. Threaded fasteners 90, 91 may be inserted through openings 94 near the outer perimeter of mounting plate 80, and through openings 119, 120 in supports 108, 109. One or more rubber isolators 102, 103 may be inserted between the mounting plate and the supports. Rubber isolators 102, 103 may be ring-shaped or sleeve-shaped members and may extend at least partially through openings 94 in the mounting plate. Additional rubber isolators 100, 101 may be positioned above the mounting plate. Threaded fasteners 90, 91 may be secured and tightened with nuts 117, 118. Additionally, washers 104-107 may be inserted and located between the threaded fasteners and rubber isolators.

In the embodiment shown in FIGS. 6 and 7, mounting plate 80 may have an outer perimeter with sides or edges 86-89. At least one of the sides or edges may include a stiffening structure such as a rim or wall having an increased cross section or thickness. Additionally, the mounting plate may include one or more stiffening structures 96-99 that span or extend across the outer perimeter. Stiffening structures 96-99 may be ribs, webs or fins, for example, and may have a spoked pattern and/or intersect or cross other non-parallel stiffening structures.

In one embodiment, mounting plate 80 may include an integral recess 111 for mounting and positioning hydraulic motor 82. For example, recess 111 may be generally conical or frustaconical in shape. Recess 111 may extend downwardly from surface 110 of the mounting plate, preferably less than about one inch. The cone-shaped recess may provide additional thickness and stiffness around the open circular area where the motor mounts.

In one embodiment, the mounting plate may be a ductile iron casting. Cast iron is preferred because of its high stiffness and relatively low cost. In other alternative embodiments, the mounting plate may be formed from or include other materials that provide high stiffness at a relatively low cost. The tensile strength of the mounting plate may be at least about 25,000 lb/in$^2$.

In one embodiment, the mounting plate surface 110 may have a nominal wall thickness of between about 5 mm and about 10 mm, and preferably between about 6 mm and about 8 mm. The stiffening structures may have a higher thickness than the nominal wall thickness, and preferably at least about twice the nominal wall thickness of the mounting plate surface 110.

In one embodiment, the stiffness of the mounting plate may be at least ten times the stiffness of the rubber isolators. The high stiffness of the mounting plate relative to the rubber isolators allows the rubber isolators to deflect and absorb the vibration of the hydraulic motor without the mounting plate deflecting. As a result, the path of vibration from the hydraulic motor is blocked or attenuated before reaching the surface of the mower deck. The mounting assembly of the present invention reduces noise produced by vibration of a hydraulic motors on a mower deck.

In one embodiment, each mounting plate may have an area of at least about 50 square inches. The base or lower end of each hydraulic motor has an area less than about 20 square inches. Thus, the mounting plate has an area at least about twice that of the hydraulic motor base mounted thereto.

The shape and dimensions of the mounting plate may be varied considerably in accordance with the invention, but it is preferred that the mounting plate be configured so that it can be mounted with threaded fasteners and rubber isolators to a mower deck's top surface. Although it is preferred that the mounting plate have a horizontal alignment on the top surface of a mower deck, the alignment need not be horizontal. Thus, a non-horizontal mounting plate may be used to mount a hydraulic motor to a mower deck, in accordance with the teachings of the present invention, to reduce or attenuate noise and vibration from the hydraulic motor mounted to the mower deck.

Additionally, it is preferred that the mounting plate be attached to one or more supports extending from the mower deck's top surface, but the mounting plate instead may be mounted directly to a mower deck, as described in the fourth embodiment below. If the mounting plate is attached to supports extending from the mower deck, the supports should be under at least two of the sides or edges of the mounting plate's perimeter. For example, a single support may be used that extends under two of the edges or sides of the perimeter, instead of a pair of supports. Additionally, the supports should not restrict the pulleys and belts connecting the hydraulic motor shaft to the vertical spindles for the rotary cutting blades under the mower deck.

In a fourth embodiment of the invention, the mounting assembly may be used to mount a hydraulic motor to a mower deck covering a single rotary cutting blade. The mounting assembly may include a stiff mounting plate connected to the mower deck with threaded fasteners, and having rubber isolators between the mounting plate and deck. The mounting plate may be fastened to the mower deck at a position spaced from the deck surface sufficiently so that the hydraulic motor may be connected to the blade spindle or shaft, or the mounting plate may be fastened to the mower deck at a position flush with or very close to mower deck surface, and the hydraulic motor may extend into a recess in the mower deck under the mounting plate, to facilitate connection to the blade spindle or shaft.

Having described the preferred embodiment, it will become apparent that various modifications can be made without departing from the scope of the invention as defined in the accompanying claims.

The invention claimed is:

1. An apparatus comprising:
   a mower deck for a grass mowing machine covering a plurality of cutting blades attached to the ends of vertically aligned spindles driven by a belt;
   a plurality of supports projecting above the mower deck;
   a cast iron mounting plate spaced above the mower deck and having a nominal wall thickness, an outer perimeter; and a plurality of stiffening structures having a higher thickness than the nominal wall thickness;
   a hydraulic motor having a base mounted on the mounting plate at a location spaced from the perimeter of the mounting plate; and
   a plurality of rubber isolators between the mounting plate and the supports.

2. The apparatus of claim 1 wherein the mounting plate is ductile cast iron.

3. The apparatus of claim 1 further comprising a recess in the mounting plate for positioning the hydraulic motor.

4. The apparatus of claim 3 wherein the recess is frusta-conical in shape.

5. A mounting assembly to mount the base of a hydraulic motor to a mower deck, the motor engaging a belt to rotate a plurality of cutting blades, comprising:
   a cast iron mounting plate with a perimeter enclosing the hydraulic motor base, a plurality of fasteners holding the motor base to a recess in the cast iron mounting plate spaced from the perimeter, the cast iron mounting plate positioned in a horizontal plane above the mower deck and belt on a plurality of supports on the mower deck, the cast iron mounting plate having a nominal wall thickness, an outer perimeter; and a plurality of stiffening structures having a higher thickness than the nominal wall thickness; and
   a plurality of rubber isolators between the cast iron mounting plate and the supports.

6. The mounting assembly of claim 5 wherein the stiffening structures are ribs.

7. The mounting assembly of claim 5 wherein the mounting plate is spaced about one inch to about three inches above the mower deck.

8. An apparatus comprising:
   a cast iron mounting plate positionable on supports extending upwardly from a top surface of a mower deck covering a plurality of rotary cutting blades mounted to lower ends of vertical spindles,
   a hydraulic motor having a downward extending output shaft,
   a pulley mounted to the shaft to engage an endless belt transmitting rotational power from the shaft to a plurality of pulleys rotationally mounted on the top surface of the mower deck,
   the plate positioned above the endless belt and pulleys and having an outer perimeter and a nominal wall thickness, a plurality of stiffening structures having a higher thickness than the nominal wall thickness, and a plurality of rubber isolators around the threaded fasteners, the motor positioned in a hydraulic motor mounting recess spaced from the outer perimeter.

9. The apparatus of claim 8 wherein the stiffening structures comprise a plurality of intersecting stiffening ribs on the mounting plate.

10. The apparatus of claim 8 wherein the mounting plate is cast iron.

11. The apparatus of claim 8 wherein the hydraulic motor mounting recess extends downwardly from the mounting plate.

12. The apparatus of claim 8 wherein the rubber isolators are positioned between the supports and the mounting plate.

* * * * *